United States Patent [19]
Santini et al.

[11] Patent Number: 5,600,880
[45] Date of Patent: Feb. 11, 1997

[54] PROCESS FOR FORMING VERTICAL GAP IN A THIN FILM MAGNETIC TRANSDUCER

[75] Inventors: Hugo A. E. Santini, San Jose; Clinton D. Snyder, Los Gatos, both of Calif.

[73] Assignee: International Business Machines Corporation, Armonk, N.Y.

[21] Appl. No.: 440,513

[22] Filed: May 12, 1995

Related U.S. Application Data

[62] Division of Ser. No. 207,971, Mar. 7, 1994, abandoned.

[51] Int. Cl.$^6$ ............................................ G11B 5/42
[52] U.S. Cl. ......................... 29/603.14; 29/603.15
[58] Field of Search ......................... 29/603.13, 603.14, 29/603.15, 603.16; 360/120, 125

[56] References Cited

U.S. PATENT DOCUMENTS

| | | | |
|---|---|---|---|
| 4,670,972 | 6/1987 | Sakakima | 29/603 |
| 4,837,924 | 6/1989 | Lazzari | 29/603 |
| 4,901,177 | 2/1990 | Lazzari | 360/113 |
| 4,912,584 | 3/1990 | Mallary et al. | 360/126 |
| 5,062,196 | 11/1991 | Devoux-Dauphin | 29/603.15 |

Primary Examiner—Carl E. Hall
Attorney, Agent, or Firm—Leslie G. Murray

[57] ABSTRACT

In the manufacture of a thin-film magnetic head having a vertical gap, auxiliary support is provided at the ends of a gap wall prior to formation of the magnetic poles. In a preferred embodiment, a pit is defined in a substrate and a release layer is deposited on the substrate followed by a layer of alumina. A recess is then etched through the alumina layer to the release layer in the pit. A partial layer of polymer or metal is deposited with a vertical edge across the median of the pit and recess. A layer of nonmagnetic wall material such as silicon oxide is deposited which after etching leaves a wall against the vertical edge of the partial layer. After removal of the partial layer, a vertical wall extends transversely across the recess and pit with the ends of the wall anchored and supported at the recess sidewalls. Alternatively, a pedestal may be provided in the recess to support each end of the wall. The magnetic poles are then formed simultaneously on either side of the wall. Other thin film layers are then deposited in an appropriate sequence of steps to complete the desired vertical gap, horizontal head structure. The substrate is separated from the completed thin film structure by dissolving the release layers.

17 Claims, 9 Drawing Sheets

PROCESS FOR FORMING VERTICAL GAP IN A THIN FILM MAGNETIC TRANSDUCER

This is a divisional of application Ser. No. 08/207,971 filed on Mar. 7, 1994, now abandoned, in the name of H. A. Santini and C. D. Snyder.

BACKGROUND OF THE INVENTION

1. Field of the Invention

The present invention relates generally to magnetic information storage devices, and more particularly to transducers for use in such devices. Still more particularly, the present invention relates to a thin film magnetic read/write head having a vertical magnetic gap and a method of fabrication therefor.

2. Description of Related Art

Magnetic disk drives are information storage devices which utilize at least one rotatable magnetic media disk having concentric data tracks defined for storing data, a read/write transducer for reading the data from or writing the data to the various data tracks, a support means, generally referred to as a slider, for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk. Alternatively, the transducer may operate in contact with the surface of the media. The suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

While magnetic recording of information is enormously successful, there is an ever increasing need to improve recording density. In the present state of the art the popular method of magnetic recording has been horizontal or longitudinal recording. In longitudinal recording, the magnetic polarity of the recorded bits is oriented horizontally or coplanar with respect to the recording medium surface. The magnetic flux from one of the pole tips of the write head passes through the magnetic storage medium horizontally downstream (or upstream), in reference to the direction of relative movement of the magnetic storage medium, to a return pole which forms the flux return path for the write head. The poles are separated by a gap which is made very small in order to 'focus' the magnetic flux onto a small area of the magnetic medium at any one time during the write operation, thereby allowing a larger number of data bits to be recorded per lineal dimension along a data track. The width of the poles dictates the width of the data track and thus the number of data tracks that can be formed on the medium.

Needless to say, the thin gap between the magnetic poles must be precisely formed with the poles precisely aligned in order to improve the performance of the write head. To this end, the current state of the art offers several thin-film deposition approaches to fabricate the write head. These approaches all involve depositing multiple layers of magnetic and non-magnetic materials onto a substrate in selected sequences using vacuum deposition and/or plating techniques. The thin film heads so obtained are generally one of two types, namely those mounted with the thin film layers perpendicular to the magnetic medium and those mounted with the thin film layers parallel to the medium. For the former type of thin-film heads, typically two thin film magnetic pole layers are separated by a layer of gap material on a substrate. The fabrication process involves vertically cutting through the layers to expose and define the tips of the poles at the plane of the cut. A lapping step is therefore required to finish the pole tips which enhances the possibility of damage to the heads.

For the latter type of thin-film heads, a vertical wall which is perpendicular to the thin film layers separates the two poles, thereby defining the gap between the pole tips. One approach is to build the wall against the vertical edge of a pole layer and substrate, followed by joining a second substrate to the wall and forming a second pole layer across the wall opposite from the first pole layer. An example of such approach has been disclosed in U.S. Pat. No. 4,670,972 to Sakakima. This process has several drawbacks. First, a lapping step is required which enhances the possibility of damage to the heads. Second, alignment of the poles relies on the alignment limitation inherent in the photolithographic technique used in forming the poles in separate steps. Third, the requirement of joining two parts creates processing problems and does not facilitate batch processing on a wafer.

Another approach is to first build a free-standing wall, followed then by forming the magnetic poles on either side of the wall, as exemplified by U.S. Pat. No. 4,837,924 to Lazzari. U.S. Pat. No. 4,912,584 to Mallary discloses an approach to building a head adapted for mounting on the side of a slider, involving first building a free-standing wall on a substrate and then forming the poles.

Copending U.S. patent application Ser. No. 08/002,290 filed Jan. 8, 1993, commonly assigned to the assignee of the present invention, utilizes an approach involving first building a free-standing wall on a release layer which has been previously deposited on the substrate and then depositing the individual thin film layers of the head starting with the magnetic pole layers. The substrate is then removed by attacking i.e., dissolving, the release layer to leave the head or transducer with pole pieces exposed and separated by the wall. This process has been implemented in a so called "reed" approach to carry out batch production of the read/write head and the suspension as one integral unit. This is desirable for various reasons. In conventional disk drives, the transducer and the slider are formed separately from the suspension and then attached through an operator controlled precision operation. The parts are small and the positioning of each relative to the other must be exact. The transducer must be exactly positioned relative to the data track which in turn means that the suspension must be exactly positioned onto the slider. The suspension must provide flexibility and pitch and roll motion for the slider relative to the direction of motion of the rotating disk and yet provide resistance to the yaw motion. Any error in the placement of the suspension relative to the slider requires reattachment or can result in the scrapping of both pieces.

Once the suspension and the slider are correctly positioned, conductor leads must then be connected to the transducer. The conductor leads are directed along the suspension and connected to an amplifier placed on the suspension or otherwise attached to the actuator. The conductor leads must not add to the spring stiffness of the slider/suspension while yet providing good electrical interconnection. The conductor leads are generally bonded by soldering, for instance, to both the transducer output terminals and the amplifier by an operator. Again, assembly errors can cause scraping of the entire combination.

An integral construction using the reed approach to producing the transducer-slider-suspension alleviates some of the manufacturing concerns and permits the head and suspension to be easily and accurately manufactured in a batch process on an initial wafer surface.

The free-standing wall approaches utilized in the past are, however, not free from manufacturing difficulties. It has been experienced that the free-standing wall was fragile and not reproducibly self-supporting. This problem is exacerbated when the free-standing side wall is subject to the harsh environment of subsequent process steps which are carried out prior to formation of the magnetic poles, such as photoresist processing, etching and plating. In order to be able to survive subsequent processing, the structural integrity of the wall must be improved.

SUMMARY OF THE INVENTION

It is therefore a primary object of the present invention to provide an improved process for manufacturing a magnetic head which utilizes a vertical wall for defining a magnetic gap between the magnetic poles of the head.

It is another object of the present invention to create a longitudinal recording head which is suitable for batch processing in planes parallel to the major surface of the wafer or substrate.

In accordance with the principles of the present invention, auxiliary support is provided to the ends of the vertical wall prior to formation of the magnetic poles.

In a preferred embodiment, a pit or recess is defined in the substrate and a release layer is deposited over the substrate followed by a layer of aluminum oxide, referred to as alumina. A recess is then etched through the alumina layer to the release layer in the region of the pit. A partial layer of polymer or metal material is deposited with an edge across the median of the pit and recess. A layer of wall material such as silica is deposited which after etching leaves a vertical wall against the partial layer of polymer or metal. The wall extends to the sidewalls of the recess and alumina covered pit where the ends of the wall are butted against and anchored to the sidewalls. The magnetic poles are then formed simultaneously on either side of the wall. Additional thin film layers are then deposited in an appropriate sequence of steps to complete the desired vertical gap, horizontal head structure. The substrate is separated from the completed thin film structure by attacking i.e., dissolving, the release layer or layers. The pole tips are thereby exposed which do not require lapping or polishing since they were formed on the release layer surface in a plane parallel to the substrate surface. Alternatively, a pedestal may be provided on the alumina covered pit walls at each end of the wall for support of the wall.

The planar deposition arrangement for the present invention permits all processing of the head and the suspension assembly to be performed on a wafer surface to form a single integral unit. This allows batch production of multiple units of the head/suspension assembly on a single wafer. Additionally, production of the unitary transducer/suspension assembly is facilitated since extensive and multiple lapping steps are avoided.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DESCRIPTION OF THE PREFERRED EMBODIMENT

The present description is made for the purpose of illustrating the general principles of the invention and should not be taken in a limiting sense. The scope of the invention is best determined by the claims appended hereto.

Figure 1:
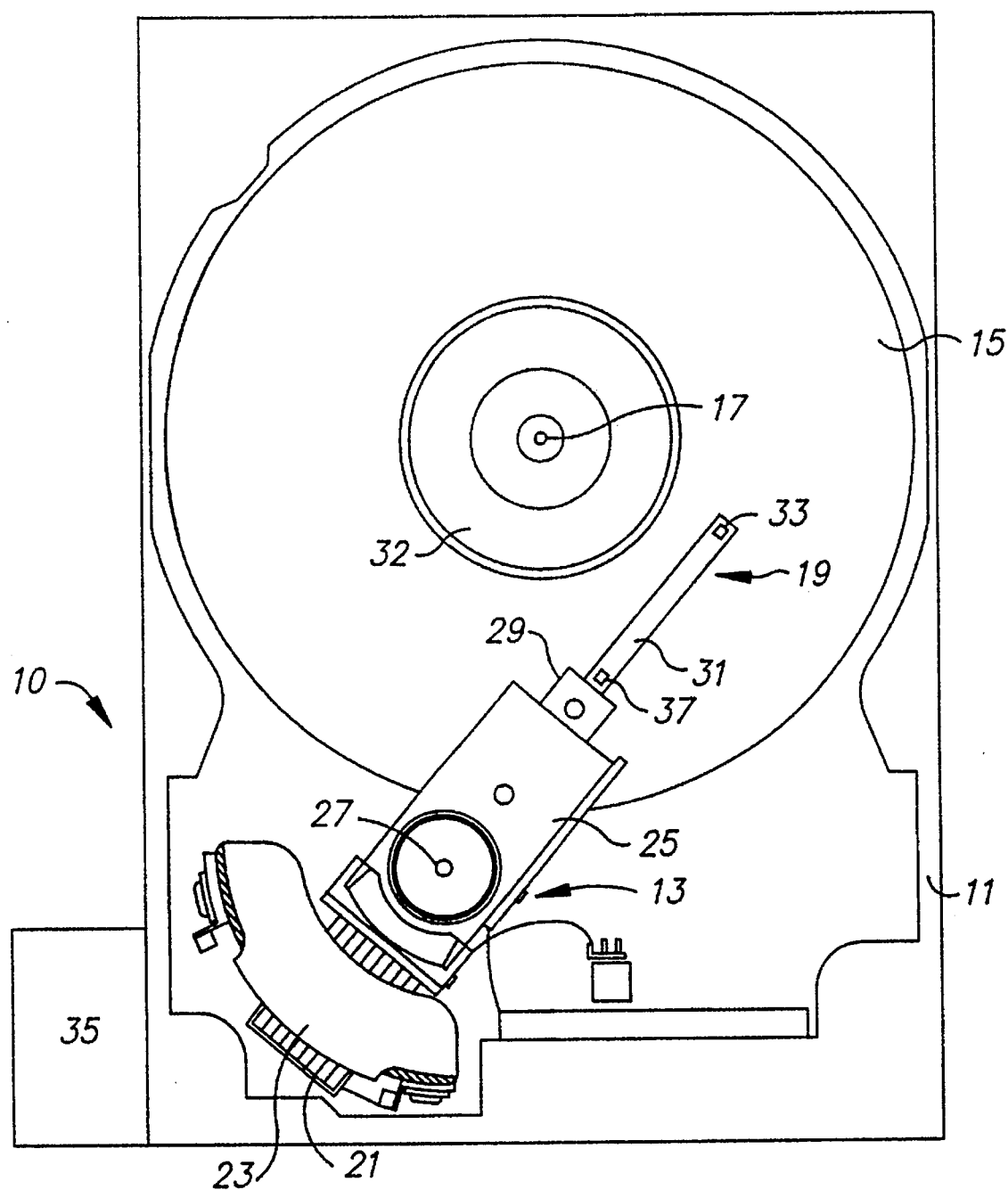
FIG. 1 is a top view of a magnetic recording system with a rotary actuator which employs a reed transducer/suspension assembly having a magnetic transducer fabricated in accordance with the present invention.

Although the present invention is described as embodied in a magnetic disk storage system as shown in FIG. 1, it will be apparent that the invention is also applicable to other magnetic recording systems such as a magnetic tape recording system, for example. Referring now to FIG. 1, a magnetic disk storage system 10 is shown, including a housing 11 in which is mounted a rotary actuator 13, one or more associated magnetic storage disks 15 mounted on a spindle 17 and a drive means (not shown) coupled to spindle 17 for rotating the disk 15. The rotary actuator 13 moves an integrated transducer/suspension reed assembly 19 produced according to the present invention in an arcuate path across the surface of the storage disk 15. The rotary actuator 13 includes a voice coil motor comprising a coil 21 movable within the magnetic field of a fixed permanent magnet assembly 23. An actuator arm 25 having the moving coil 21 formed on one end thereof is pivotably mounted on a pivot post 27. A support arm 29 is attached to the other end of the actuator arm 25 and projects across the surface of the disk 15. The support arm 29 supports the integrated reed assembly 19 in cantilever fashion over the surface of the disk 15. The reed assembly 19 includes a suspension section 31 and a transducer/slider 33 formed at one end thereof, having an air bearing surface (ABS). The term ABS refers to the side of the slider which is generally parallel to and adjacent the media surface 15 in both flying mode winchester-type disk files and contact recording applications.

The suspension section 31 of the reed assembly 19 provides a load on the transducer/slider 33 which is substantially normal or perpendicular to the surface of the disk 15. This perpendicular load maintains the transducer/slider 33 in contact with the data surface of the disk 15 when the disk 15 is not being rotated. During operation of the disk drive 10 an aerodynamic lifting force is generated between the ABS of the transducer/slider 33 and the surface of the rotating disk 15, opposing the perpendicular load applied to the transducer/slider 33 thereby causing the transducer/slider 33 to fly above the disk surface. Alternatively, in contact recording, during rotation of the disk 15, the ABS of the transducer/slider 33 remains in contact with the media for reading or recording data.

The various components of the disk storage system 10 are controlled in operation by signals, such as data access control signals and internal clock signals, generated by a control unit 35 which may include logic control circuits, storage means and a microprocessor. The control signals control various system operations such as motor control and head positioning control. The control signals provide the desired current profiles to optimally move and position a selected slider to the desired data track on the associated disk 15 by means of the actuator 13. The moveable coil 21 is controlled by positioning signals to move within the magnetic field of the magnet assembly 23 and thus pivot the actuator arm 25 about the pivot post 27. Because it is desired to provide rapid access of the transducer/slider 33 from one track to another track for read or write operations, it is necessary that the transducer be properly positioned over the desired track and reach that track in a minimum amount of time. Read and write signals are communicated to and from the transducer 33 which includes a read head and a write head or a dual purpose read/write head as is illustrated by the embodiments disclosed hereinbelow. Data encoded write signals induce changes in the magnetic fields of the magnetic poles in the write head which correspondingly align the magnetic directions of the data regions on the data tracks of the disk 15, thereby recording binary data on the tracks which data are manifested by transitions in magnetic directions between data regions. Recorded data can be later retrieved from the disk 15 by detecting the magnetic transitions on the tracks with the read head and decoding the read signals corresponding thereto.

The reed assembly 19 must provide radial stiffness, and have substantial flexibility about its pitch and roll axes as it rides above the data surface of the disk 15. If desired, an integrated circuit amplifier assembly 37 may also be produced on the suspension section 31 of the integrated reed assembly 19.

The above description of a typical magnetic disk storage system, and the accompanying illustration of it in FIG. 1 are for representation purposes only. It should be apparent that disk storage systems may contain a large number of disks and actuator arms, and each actuator arm may support a number of sliders. It should be noted that while the actuator 13 illustrated in FIG. 1 is a rotatory actuator, other disk drive systems may utilize a linear actuator such as is known in the art.

Figure 2:
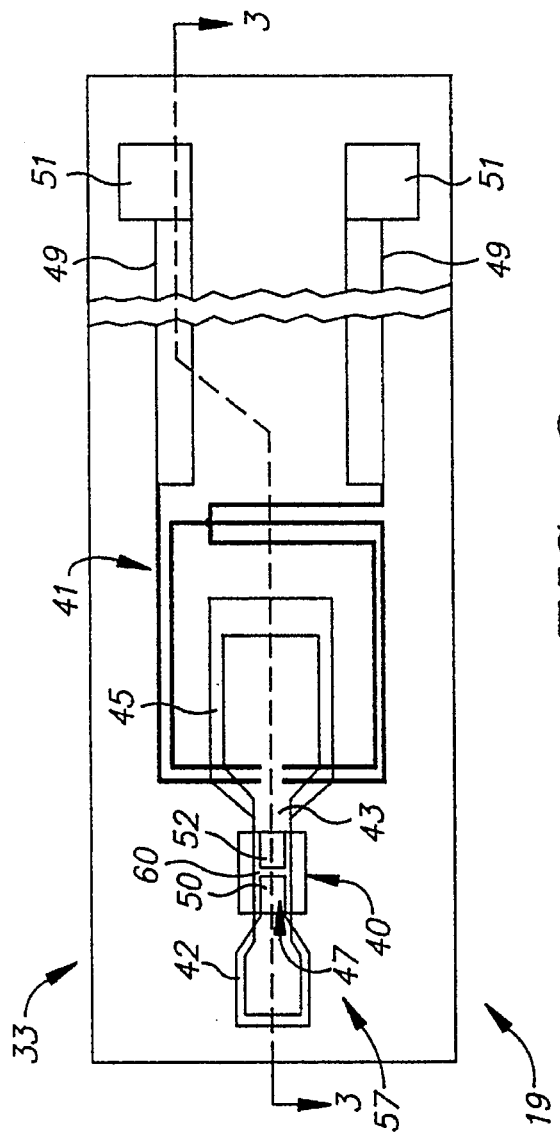
FIG. 2 is a top plan view of the preferred embodiment of a combination reed transducer/suspension assembly having a magnetic transducer fabricated according to the present invention.
Figure 3:
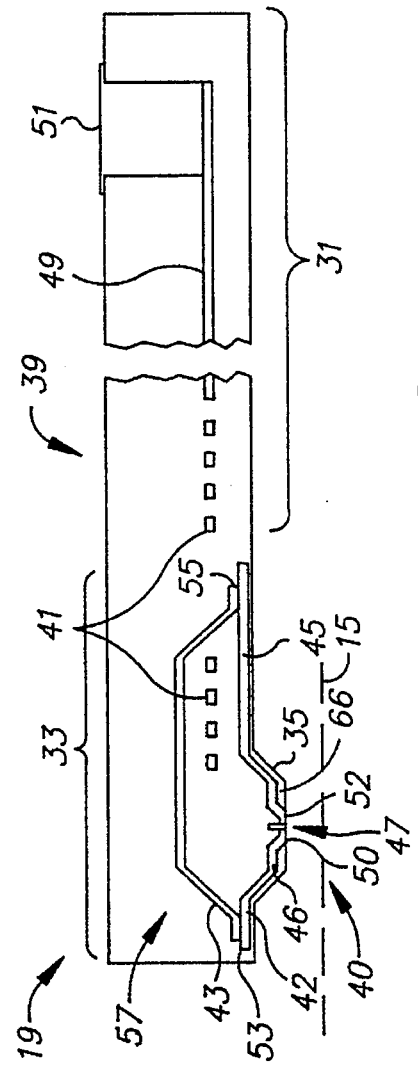
FIG. 3 is a cross-sectional view of the reed transducer/ assembly shown in FIG. 2, taken along section line 3—3.

Referring now to FIGS. 2 and 3, a preferred embodiment of the integrated reed transducer/suspension assembly 19 according to the principles of the present invention is illustrated. The transducer 33 is formed integrally with the suspension section 31 to provide an integrated and unitary reed transducer/suspension assembly 19. In the preferred embodiment, the transducer is a dual-purpose read/write head and comprises a ring-type magnetic inductive head for longitudinal recording applications, as generally described in co-pending U.S. patent application Ser. No. 08/002,290 filed on Jan. 8, 1993 and hereby incorporated by reference as if fully set forth herein.

The integrated reed assembly 19 comprises an elongated generally rectangular body 39 of a dielectric material such as aluminum oxide ($Al_2O_3$) or silicon dioxide ($SiO_2$), for example, having a relatively uniform thickness along most of its length forming a suspension section 31. The body 39 is formed with a somewhat greater thickness at one end, the left hand end as shown, wherein a magnetic read/write head 33 is formed and a slider ABS is patterned on a lower surface thereof. As shown in FIG. 3, the ABS comprises a shaped protrusion 40 formed on the lower side of the reed assembly body 39, which may include material forming a wear or contact pad for contact recording during which the ABS comes into contact with the media surface 15. Alternatively, the shaped protrusion 40 can form a slider having an ABS patterned on its lower surface (i.e., the surface in opposing relationship with the media surface 15) to generate a lifting force when relative motion exists between the reed assembly 19 and the media disk 15 to allow the slider to fly closely above the media surface.

The read/write head 33 includes a magnetic circuit comprising an upper magnetic yoke 43 magnetically coupled to lower yoke sections 42 and 45 at a front stud 53 and a back-gap stud 55, respectively. The lower yoke sections 42 and 45 are separated by a horizontal gap 47 defined by a vertical gap wall 60 formed between the two pole pieces 46 and 48. The pole pieces 46 and 48 are shaped to provide the gap 47 near the surface of protrusion 40 with the pole tips 50 and 52 substantially co-planar so as to be closely adjacent the recording media.

Inductively coupled to the magnetic yoke structure is a horizontal spiral coil 41, with the ends of the coil connecting through lead conductors 49 extending the length of the suspension section 31 to terminal bonding pads 51. The entire thin-film transducer structure is protected by an overcoat 57 of alumina, for example. The reed assembly 19 is fabricated by a process which includes a combination of individual well-known deposition and photolithography steps. Manufacturability of the reed assembly 19 is greatly simplified in that the complete reed assembly 19 is fabricated in layers parallel to a supporting substrate, and the completed assembly is then separated from the substrate.

While for a particular application the specific dimensions are chosen for optimum performance, in general the reed assembly 19 will have an overall length in the range of about 5 to 20 millimeters (mm), a maximum width in the range of about 0.3 to 2.0 mm, a maximum thickness of about 20 to 50 micrometers (µm) in the suspension section 31 and about 30 to 65 μm in the transducer section 33 and a total mass in the range of about 200 micrograms to 2.0 milligrams.

Figure 4:
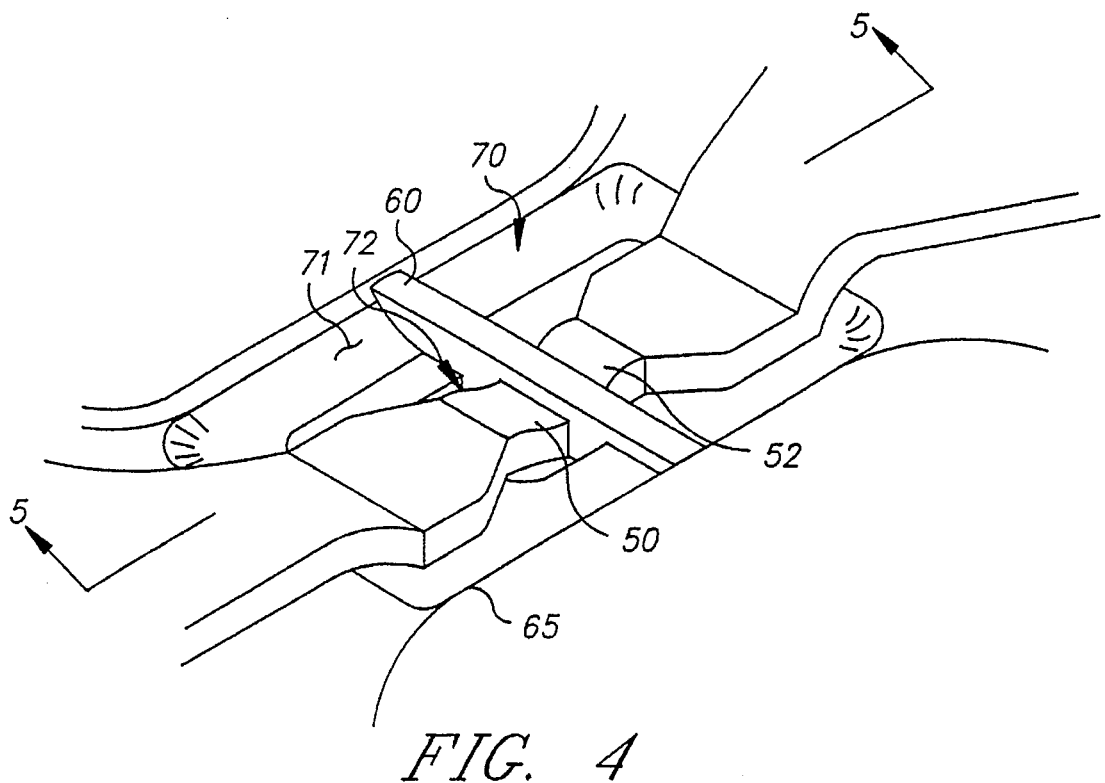
FIG. 4 is a perspective view illustrating the pit region on the substrate in accordance with one embodiment of the process of the present invention.

To make it easier to understand the process to be accomplished in accordance with the present invention, it will be beneficial to take an overview look at the gap wall structure to be constructed by the process. FIG. 4 is a perspective view illustrating the pole tip region as seen from inside the transducer, with the overcoat layers and the upper yoke structure omitted for clarity. The pole pieces 46 and 48 are formed in a pit 70 formed in a base substrate 65 with the pole tips 50 and 52 formed at the bottom of a recess 72 formed in the bottom of the pit 70. Upon completion of the thin-film fabrication process, the entire transducer/suspension assembly 19 will be lifted from the base substrate to expose the pole tips 50 and 52 at an ABS or contact surface (ignoring for the moment any wear layer which may be formed over the ABS and the pole tips). The pole tips 50 and 52 are separated by a vertical wall 60 which extends across the median of the pit.

FIGS. 5A–5I are sectional views (corresponding along line 5—5 in FIG. 4) illustrating the processing steps involved in the fabrication of the reed assembly 19 shown in FIGS. 2 and 3. For simplicity, only the transducer end of the reed assembly 19 is shown, the additional processes for fabrication of the remainder of the assembly may be referred to in U.S. Pat. No. 08/002,290 which has previously been incorporated by reference, and integrated into the overall process described below.

Figure 5A:
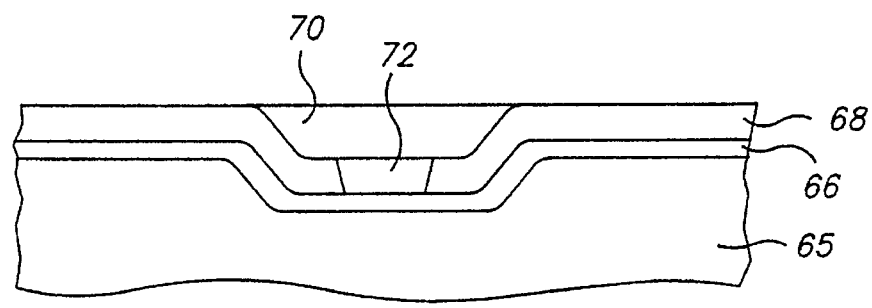
FIGS. 5A–5I are sectional views illustrating the processing steps involved in the manufacture of the reed transducer/ suspension assembly shown in FIGS. 2, 3 and 4.
Figure 5B:
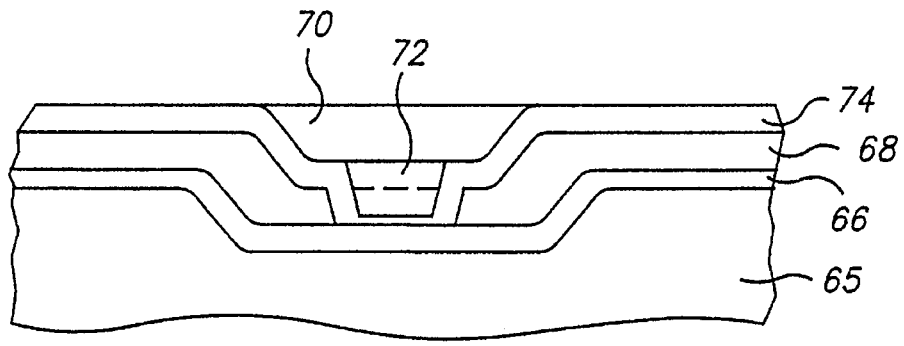

Referring now to FIGS. 5A and 5B, initially a planar process carrier substrate 65 (large enough for the overall length of the desired reed assembly 19) which can be of any suitable material known to those in the art, such as alumina-titanium-carbide (Al$_2$O$_3$-TiC) or silicon, for example, is indented to form a rectangular pit 70 via a chemical or dry process etching. In the example illustrated herein, the pit 70 has a 30 by 50 μm opening with a 20 by 30 μm flat base. A sacrificial or release layer 66 is first deposited over the indented substrate 65 by sputter deposition, for example. As will become clear below, the release layer 66 is eventually dissolved to free the finished thin-film transducer-suspension assembly 19 from the substrate 65. It is noted that alternatively, the pit 70 may be formed in the release layer 66 on a flat substrate. The release layer 66 can also be patterned to shape a subsequently deposited wear layer (see discussion below). The release layer 66 can, for instance, be an electrically conductive material and thereby can also be used as a seed or plating base layer for the subsequent layers, such as the pole pieces 46 and 48, deposited utilizing plating techniques. Likely candidates for the release layer 66 are NiFe or Cu which can be deposited using a sputtering or plating process, for example.

A barrier or undercoat layer 68 of alumina is then formed over the release layer 66. A photoresist or metal mask layer (not shown) is then deposited over layer 68 and patterned. A recess 72 is then formed in the undercoat layer 68 through layer 68 to the release layer 66. In this example, pit 72 comprises a generally rectangular recess having dimensions of about 10 by 15 μm. The next step is the deposition of a seed layer 74 by sputter deposition, for example, over the alumina undercoat 68 and the sloping sides and bottom of pit 72. The seed layer 74 is required for the deposition of the layers for the pole pieces 46 and 48 preferably by a plating process. Additionally, a thin protective overlayer (not shown) of alumina, for example, over the seed layer 74 is required to protect the seed layer during subsequent processing steps. However, an important consideration is that if the seed layer material used is magnetic, it must not be present in the magnetic gap 47 to prevent magnetically shorting the gap 47. In a preferred embodiment, a "wear-in" step for the finished transducer-suspension assembly 19 is utilized which wears or grinds away that portion of the seed layer 74 underlaying the pole tips 50 and 52 in which case the seed layer material can be magnetic. However, if no wear-in step is used, the seed layer material must be nonmagnetic, such as Cu, for example.

Figure 5C:
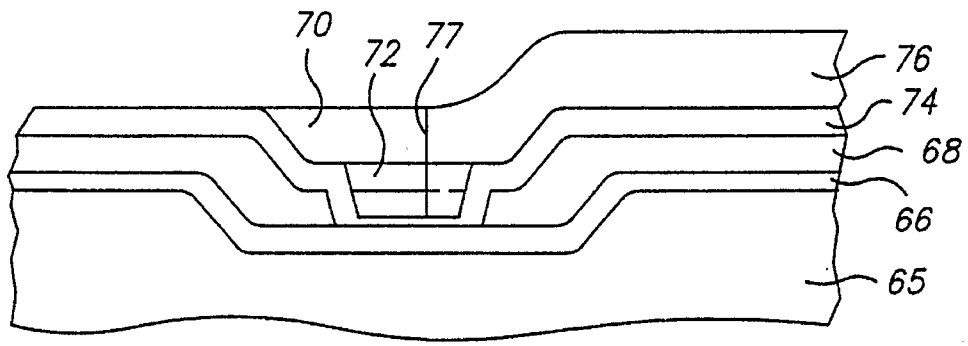

Referring now to FIG. 5C, a partial layer 76 of metallic or polymeric material such as photoresist is formed utilizing photolithographic techniques which covers almost half of the pit 70 and recess 72. The edge 77 of the partial layer 76 defines a vertical sidewall which is slightly offset from the median of the pit and recess to allow the gap wall to be formed along the median given the thickness of the wall.

Figure 5D:
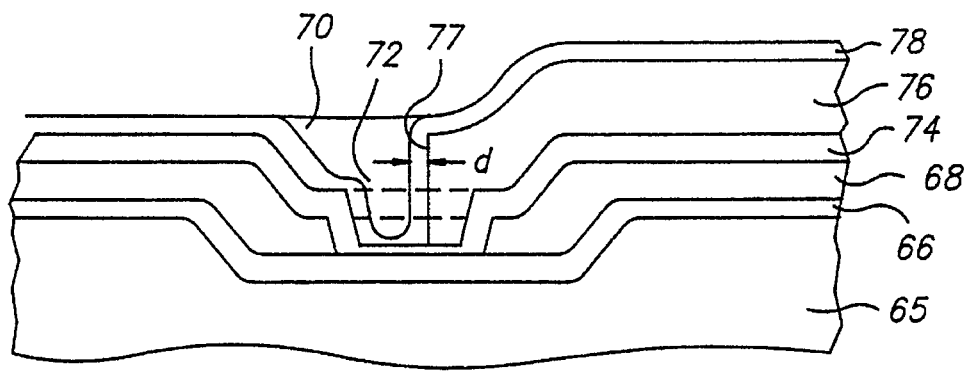
Figure 5E:
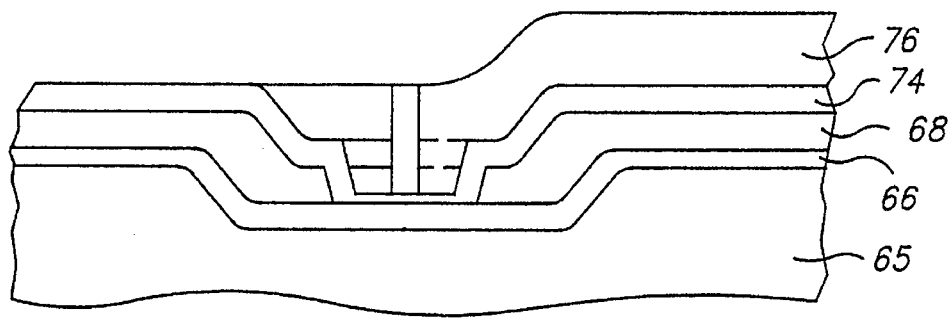
Figure 5F:
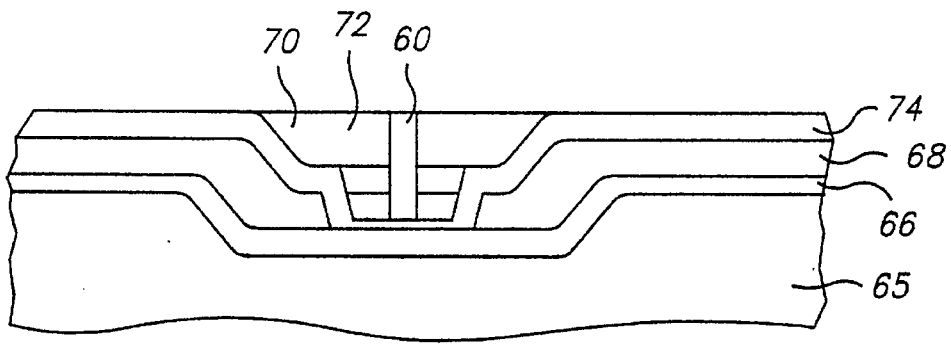

As shown in FIG. 5D, using an isotropic deposition technique such as vacuum deposition, a thin layer 78 of a nonmagnetic material such as a ceramic or dielectric material, alumina or silica (SiO$_2$) is formed over the partial layer 76 and the pit 70 and recess 72. The thickness d of this silica layer 78 is substantially the same as the thickness of the vertical magnetic gap 47 desired to be obtained. Using an anisotropic etching technique such as reactive ion etching, the silica layer 78 is preferentially etched to remove material from all horizontal surfaces (see FIG. 5E). It is noted that if any thinning of the layer 78 is encountered at the vertical sidewall 77 from this etching step, it can be compensated by initially depositing a slightly thicker layer 78 of silica. The partial layer 76 is then removed by conventional means to leave behind a vertical wall 60 which extends across the recess 72 and pit 70 (FIG. 5F). The ends of the wall 60 are butted against and attached to the sidewalls 71 (as shown in FIG. 4) of the alumina covered recess 72 and pit 70, thereby stabilizing the wall against perturbations arising from subsequent handling and process steps. Extraneous silica material may be removed from the wall by photomasking and chemical etching.

Figure 5G:
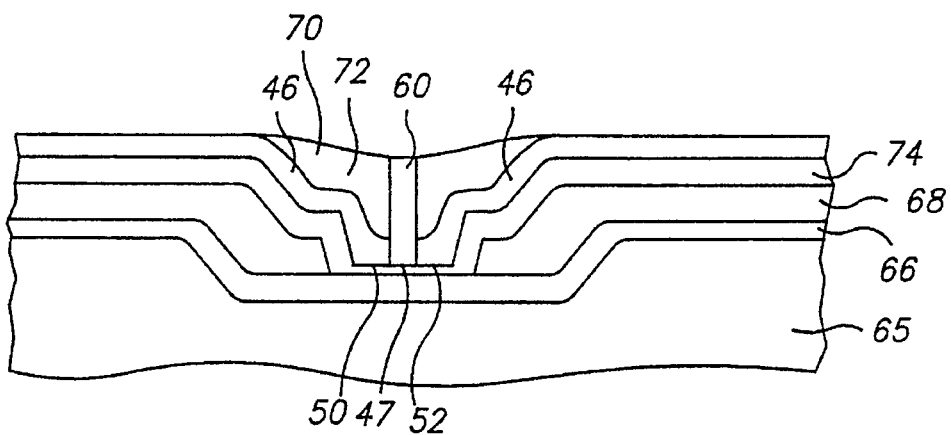

Referring now to FIG. 5G, using conventional masking and vacuum deposition or electroplating techniques, magnetic pole pieces 46 and 48 are formed simultaneously with the pole tips 50 and 52 being formed on either side of the wall 60 in the recess 72, the earlier deposited seed layer protective overlay being removed prior to plating. The structure obtained thus far resembles that shown in FIG. 4.

There are several advantages for simultaneously forming both pole pieces 46 and 48 in a single step. First, better alignment of the pole tips 50 and 52 can be obtained. Second, proximity effects, i.e., rounding of the pole corners, etc. by diffraction of the imaging flux, are minimized by having continuous illumination on both sides of the vertical wall thus providing improved line width control. Third, the composition of the pole pieces 46 and 48 will be identical.

Figure 5H:
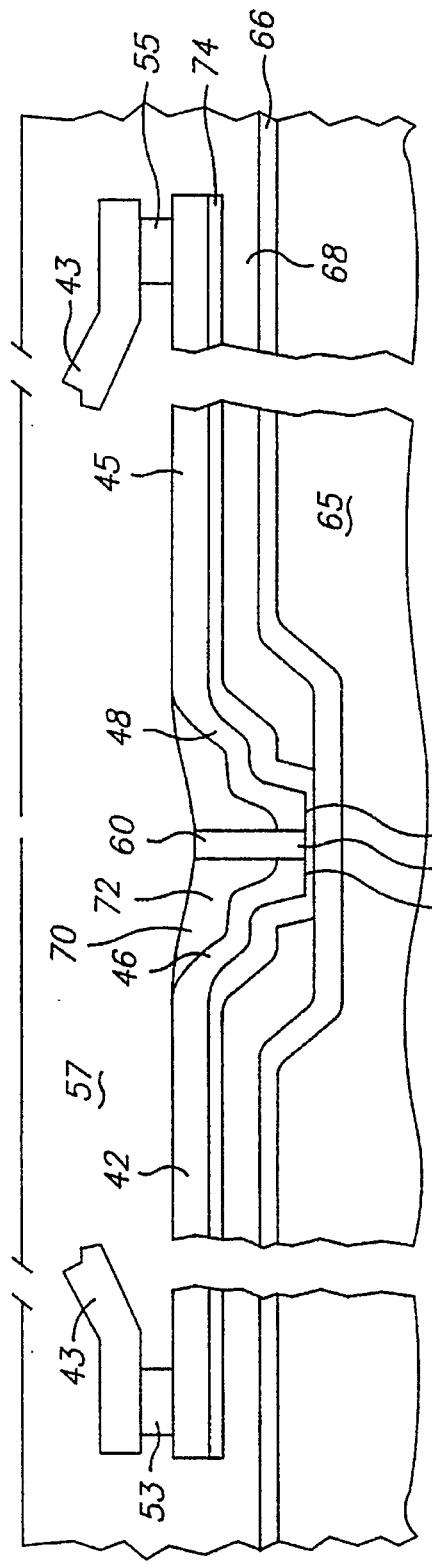
Figure 5I:
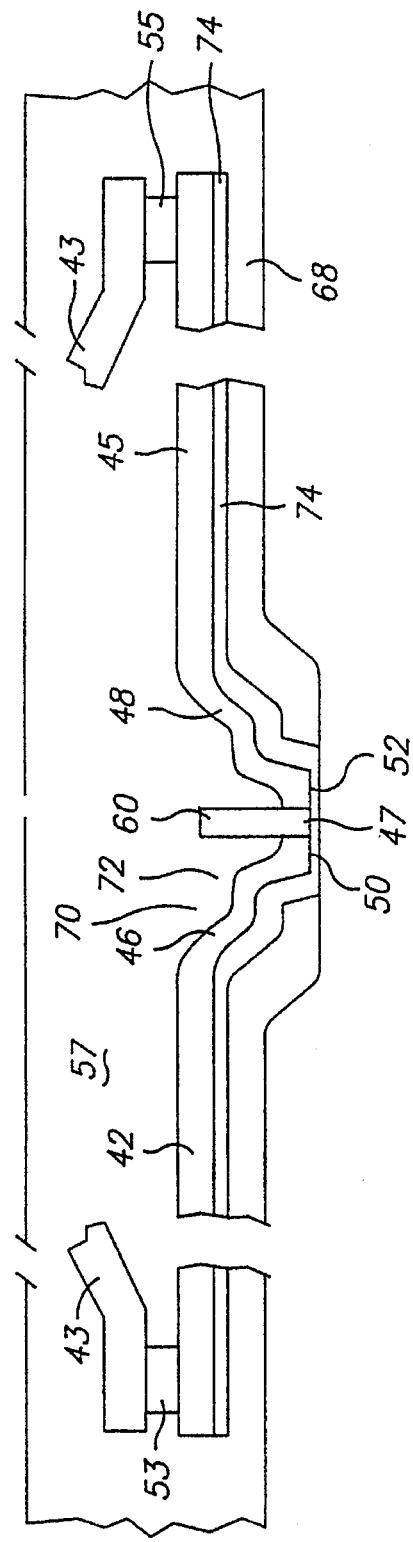

Referring now to FIG. 5H, to complete the reed assembly 19, standard stud and pad technology is used to produce the stud pads 53 and 55. The lower magnetic yoke sections 42, 45 including pole pieces 46 and 48 and upper magnetic yoke 43 are of nickel-iron alloy (NiFe), generally referred to as permalloy, or other suitable magnetic material, such as iron (Fe), nickel (Ni) and cobalt (Co) or their alloys, and are preferably plated as is well-known in the art. Similarly, the coil windings 41, lead conductors 49 and terminal bonding pads 51 are also formed of copper (Cu) or gold (Au), for example, by plating techniques. The entire lower magnetic yoke, sections 42, 45 and pole pieces 46, 48 are typically formed in one plating operation rather than just forming the lower pole pieces and later forming the remainder of the lower yokes 42 and 45. An insulation layer (not shown) is deposited over the lower pole pieces 46, 48 and lower yokes 42, 45 prior to the plating of the coil windings 41. Because of various difficulties well-known in the art which can be encountered during its fabrication, the upper yoke 43 is formed in a separate plating step and the remainder of the pole pieces plated and "stitched" to the upper yoke in a subsequent process step after the coil windings 41 and lead conductors 49 have been formed. Prior to plating of the upper yoke 43, a second insulation layer (not shown) is deposited overlaying the coil windings 41.

Figure 6A:
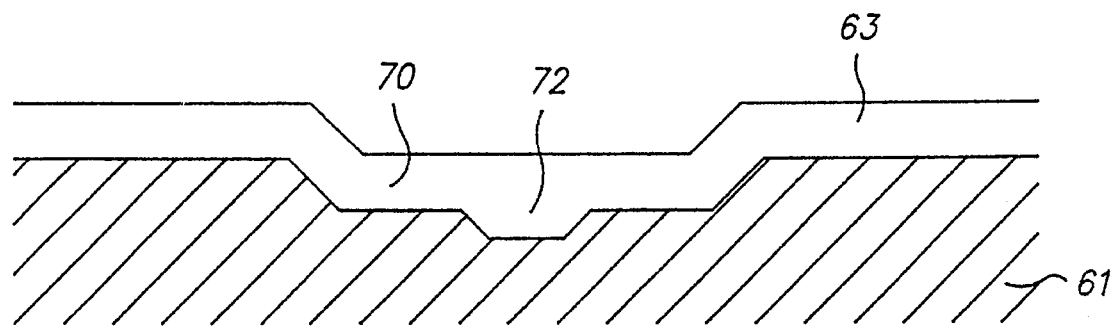
FIGS. 6A–6D are sectional views illustrating alternate processing steps for the manufacture of the reed transducer/ suspension assembly shown in FIGS. 2, 3 and 4.
Figure 6B:
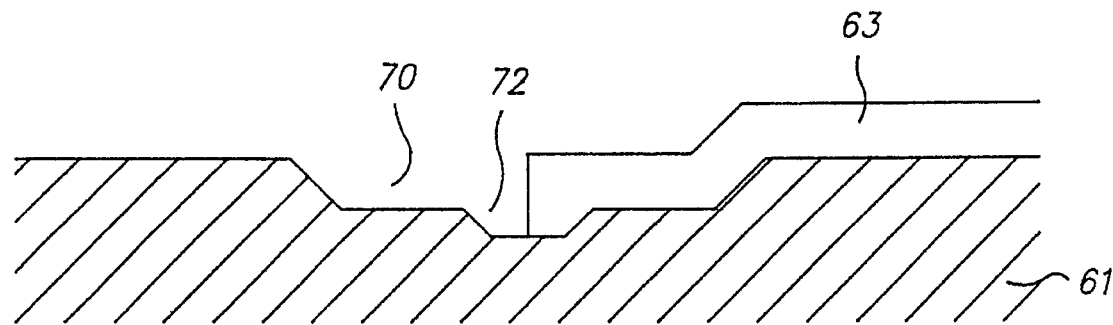
Figure 6C:
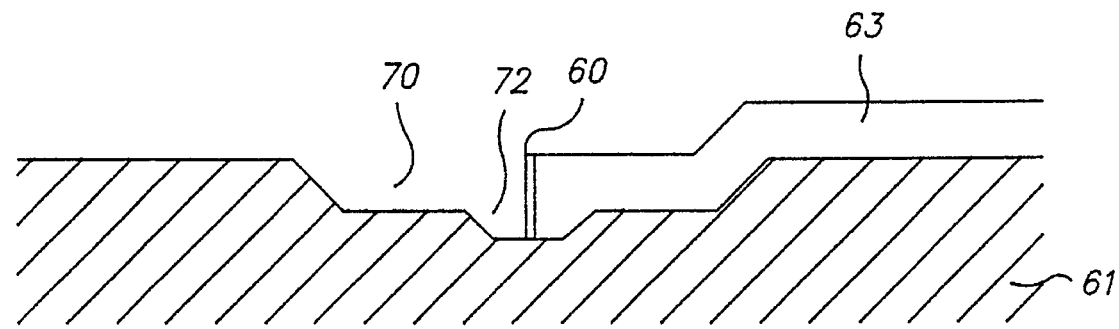
Figure 6D:
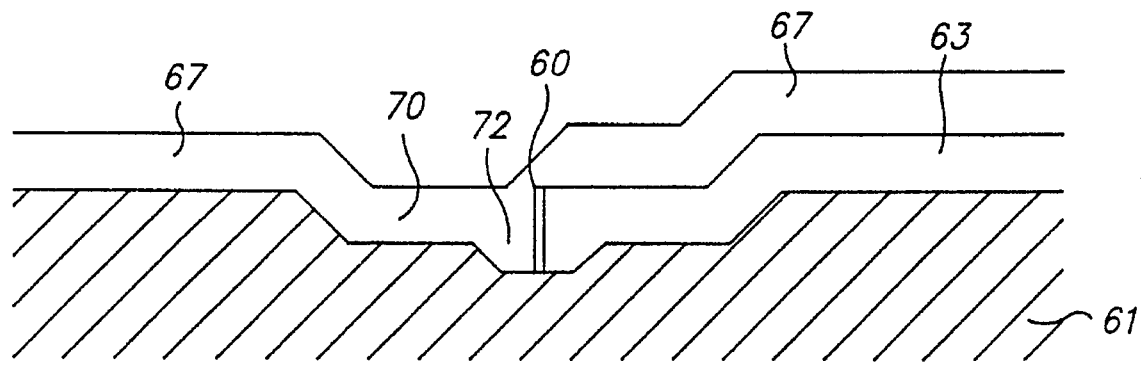
Figure 6E:
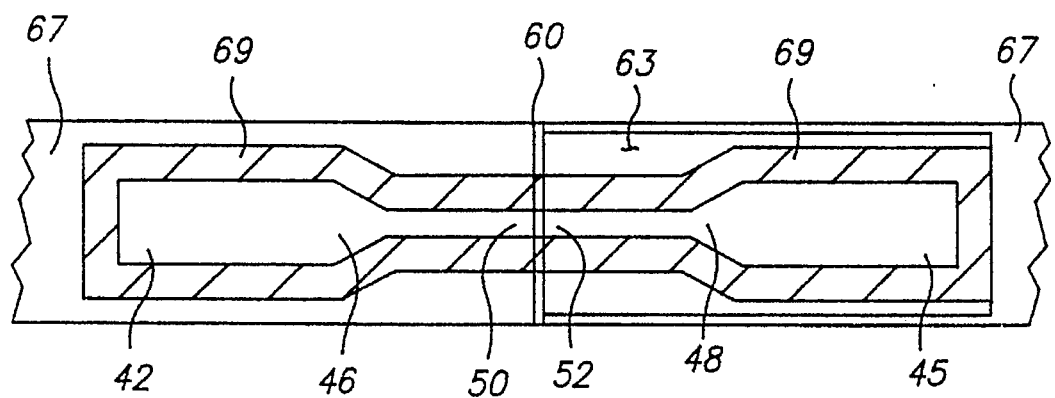
FIG. 6E is a top plan view illustrating the plating frame resulting after the patterning step illustrated in FIG. 6D.

Referring now also to FIGS. 6A–6E, an alternate sequence of process steps for forming the vertical wall 60 is illustrated. As shown in FIG. 6A, a layer 63 of photoresist, for example, approximately 5 µm thick is spun on over substrate 61. In this example, substrate 61 is prepared as described above with reference to FIGS. 5A and 5B and includes an aluminum oxide/titanium carbide substrate with an alumina isolation layer and a laminated release layer comprising Cr(300 Å)/Cu(1 µm)/Cr(2000 Å)/W(1000 Å), for example, formed on a surface of the substrate. In this embodiment, the release layer also serves as a plating seed layer. The photoresist layer 63 is patterned and cured and then etched, using reactive ion etching (RIE), for example, to form a partial layer 63 having a vertical edge 77 extending transversely across the approximate middle of the pit 70 and recess 72. A thin layer of nonmagnetic material such as $SiO_2$ is then deposited over the partial layer 63 and other exposed surfaces. A directional ion milling process, such as $CF_4$ RIE, for example, is then used to remove all of the deposited nonmagnetic material except that deposited on the vertical edge 77 to form a vertical wall 60 extending transversely across the pit 70 and recess 72. A second layer 67 of photoresist is then deposited covering the partial layer 63 as well as the remainder of the exposed substrate 61 and the pit 70 and recess 72, the total thickness of photoresist layers 63 and 67 being approximately 10 µm. The second photoresist layer 67 is then cured and the layers 63, 67 patterned to form the plating frame 69 for the lower yoke sections 42 and 45 including the pole pieces 46, 48 and pole tips 50, 52 as shown in FIG. 6E. Utilizing the above described process sequence the vertical wall thus formed is supported on both sides by photoresist layers 63, 67. The vertical wall 60 may also be constructed on a flat surface as there is no requirement to anchor the vertical wall 60 at its ends for support.

A thick layer 57 of alumina is then deposited over the finished head structure to provide complete encapsulation of the transducer 33.

The alumina suspension material is preferably sputtered to a thickness of from 20 to 50 micrometers. In the event that symmetrical stresses are desired for the reed assembly 19, the protective alumina layer 68 on the release layer should have its thickness equal to the overcoat layer at the top of the reed assembly. The planar shape of the suspension assembly is patterned around the head using conventional etching techniques well known to those in the art. When multiple assemblies are fabricated simultaneously on a substrate, the overcoat and undercoat of alumina is etched or sawed to separate adjacent reed assemblies on the substrate. The release layer is then dissolved to free the head/suspension assemblies from the substrate thereby obtaining the structure shown in FIG. 5I which is an enlarged view of the head region shown in FIG. 2.

Should a wear layer be desired to be provided for heads made for contact recording, a wear resistant layer should be deposited on the release layer 66 after etching the recess 72 (not shown in the figures), thereby forming a resistant surface on the air-bearing surface of the head. The wear layer should be deposited thin so as to avoid any subsequent lapping process near the pole tips 50 and 52. Other materials (not shown in the figures) may be overlaid on the basic reed assembly shown in FIG. 2 to improve structural integrity of the head. The structure may be finished by appropriate lapping or ion milling procedures to obtain the desired external structure. Further details may be referred to in U.S. patent application Ser. No. 08/002,290 which has previously been incorporated by reference.

Figure 7:
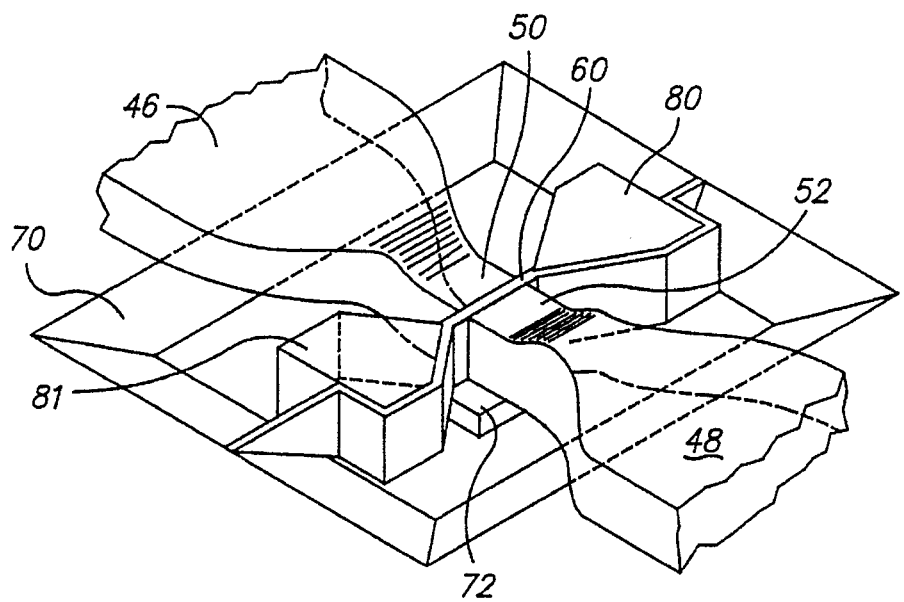
FIG. 7 is a perspective view illustrating the pit region on the substrate having a vertical wall constructed in accordance with a second preferred embodiment of the present invention.
Figure 8A:
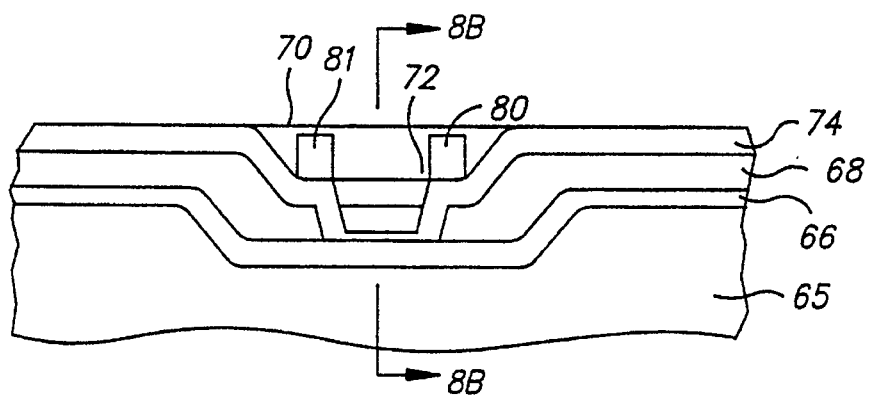
FIG. 8A is a sectional view showing the intermediate step of supporting a vertical wall using pedestals in accordance with the embodiment shown in FIG. 7.
Figure 8B:
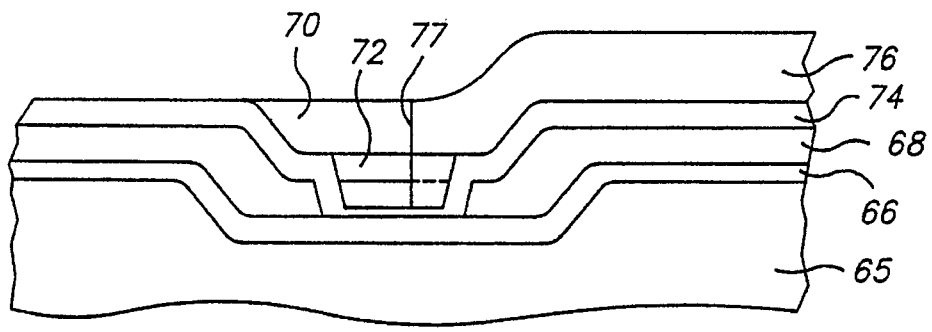
FIG. 8B is a sectional view taken along line 8B—8B of FIG. 8A showing the intermediate step of supporting a vertical wall using pedestals in accordance with the embodiment shown in FIG. 7.

Another embodiment of the present invention is disclosed with reference to FIGS. 7, 8A and 8B. In this embodiment, instead of supporting the ends of the vertical wall 60 with the alumina covered sidewalls of the pit 70 and recess 72, the wall ends are supported by two pedestals 80 and 81 in the pit 70. Further, it is noted that by using pedestals, a vertical wall may be built on an entirely flat surface without pit sidewalls.

Prior to depositing the partial layer 76 to form the sidewall 77 (i.e., after the step shown in FIG. 5B in the previously described embodiment), two pedestals 80 and 81 are formed in the pit 70 above the recess 72 as shown in FIG. 8A. This may be carried out by conventional photomasking and deposition techniques to form copper pedestals. A partial layer 76 is then deposited to cover about half of the pit 70 thereby defining a sidewall between the pedestals (see FIG. 8B) in much the same manner as was done in the previous embodiment as illustrated in FIG. 5C. The subsequent steps (not shown) are similar to the steps shown in FIG. 5D–5I in the previous embodiment. A silica layer is deposited against this sidewall. In particular, upon preferential etching of the silica layer 78 (the copper pedestals are not affected by the reactive ion etching process) and removal of the photoresist layer, a vertical wall 60 is formed between the pedestals. The rest of the process to complete the reed structure is also similar to that disclosed above in reference to the previous embodiment.

It is noted that the vertical wall in the completed heads built according to the embodiments described above no longer requires the sidewalls of the pit or recess in the alumina layer or the pedestals for support, as the wall is sandwiched between the pole tips. If desired, the sidewalls or the pedestals may be removed without affecting the integrity of the heads.

While the invention has been particularly shown and described with reference to preferred embodiments thereof, it will be understood by those skilled in the art that various changes in form and detail may be made therein without departing from the spirit and scope of the invention. It should also be evident that the rotary actuator could be a linear actuator without departing from the present invention. The structure disclosed herein may be built utilizing any conventional thin-film etching and deposition processes, e.g., sputtering, vapor deposition, plating, chemical vapor deposition, ion beam deposition and etching, etc. accompanied by well known photo-patterning of the magnetic, electrical and structure parts (including photomasking and photolithography processes). Accordingly, the invention herein disclosed is to be considered merely as illustrative and limited in scope only as specified in the appended claims.

We claim:

1. A method for fabricating a magnetic transducer comprising the steps of:

providing a substrate having a release layer formed on a surface thereof, said substrate and release layer defining a pit having sidewalls;

forming a vertical wall of a nonmagnetic material in said pit with its ends supported by the sidewalls of the pit;

forming first and second pole pieces of a magnetic material, said pole pieces each having a pole tip disposed in the pit in opposing relationship to each other separated by said vertical wall disposed therebetween defining a magnetic gap;

magnetically coupling the pole pieces; and separating the substrate from the magnetic transducer formed thereon by removing the release layer.

2. The method as in claim 1 wherein said pit includes a recess formed therein in which said pole tips are disposed.

3. The method as in claim 1 wherein the step of forming said vertical wall comprises the steps of:

depositing a layer of a first material with a vertical edge formed transversely across the pit;

depositing a layer of a second material over said vertical edge of the layer of the first material; and removing horizontal portions of said layer of second material and said layer of first material thereby leaving the portion of said layer of second material deposited over said vertical edge thus forming said vertical wall extending transversely across said pit with its ends supported by said sidewalls of the pit.

4. The method as in claim 1 wherein the step of forming said vertical wall comprises the steps of:

depositing a first layer of a first material with a vertical edge formed transversely across said pit;

depositing a layer of a second material over said layer of first material, said second material being deposited over said vertical edge;

removing horizontal portions of said layer of second material leaving that portion of said second material deposited over said vertical edge thereby forming said vertical wall; and depositing a second layer of said first material over said release layer and pit including said first layer of said first material.

5. The method of claim 4 including the further step of patterning and etching said first and second layers of first material for forming a plating frame for said first and second pole pieces.

6. The method as in claim 1 further comprising the steps of:

forming magnetic induction coils and electrical leads for said coils, said coils inductively coupled to said pole pieces; and forming a suspension member integral and unitary to said pole pieces.

7. The method as in claim 1 wherein said magnetic material comprises a material selected from the group consisting of nickel, iron, cobalt, nickel-iron and magnetic alloys of nickel, iron or cobalt.

8. The method as in claim 7 wherein said magnetic material comprises nickel-iron.

9. The method as in claim 4 wherein said first material comprises a metallic material.

10. The method of claim 4 wherein said first material comprises a polymeric material.

11. The method of claim 4 wherein said second material comprises a dielectric material.

12. The method of claim 4 wherein said second material is selected from the group consisting of aluminum oxide and silicon oxide.

13. A method for manufacturing a magnetic disk storage system comprising the steps of:

providing at least one magnetic storage disk;

providing a drive mechanism for rotating said magnetic storage disk;

providing an actuator mechanism for moving a magnetic transducer supported on a suspension member close to the surface of said magnetic storage disk;

manufacturing said magnetic transducer by the steps of:

forming a release layer formed on a substrate, said substrate and release layer defining a pit having sidewalls;

forming a vertical wall of nonmagnetic material in said pit with its ends supported by the sidewalls of the pit;

forming first and second pole pieces of a magnetic material, said pole pieces each having a pole tip disposed in the pit in opposing relationship to each other separated by said vertical wall disposed therebetween defining a magnetic gap;

magnetically coupling the pole pieces; and separating the substrate from the magnetic transducer formed thereon by removing the release layer.

14. A method as in claim 13 wherein said pit includes a recess formed therein in which said pole tips are disposed.

15. A method as in claim 13 wherein the step of forming said vertical wall comprises the steps of:

depositing a layer of a first material with a vertical edge formed transversely across the pit;

depositing a layer of a second material over said vertical edge of said layer of first material;

removing horizontal portions of said layer of second material thereby leaving the portion of said layer of second material deposited over said vertical edge thus forming said vertical wall extending transversely across said pit; and depositing a second layer of said first material over said release layer and said pit including said first layer of first material.

16. A method as in claim 15 including the further step of patterning and etching said first and second layers of first material for forming a plating frame for said first and second pole pieces.

17. A method as in claim 13 wherein said magnetic transducer is manufactured integral and unitary with said suspension member.

* * * * *